United States Patent [19]

Förster

[11] 4,305,111
[45] * Dec. 8, 1981

[54] SELF-HEALING THIN-LAYER ELECTRICAL CAPACITOR

[75] Inventor: Herbert Förster, Schorndorf, Fed. Rep. of Germany

[73] Assignee: Robert Bosch GmbH, Stuttgart, Fed. Rep. of Germany

[*] Notice: The portion of the term of this patent subsequent to Feb. 26, 1997, has been disclaimed.

[21] Appl. No.: 113,289

[22] Filed: Jan. 18, 1980

[30] Foreign Application Priority Data

Jan. 20, 1979 [DE] Fed. Rep. of Germany ....... 2902195

[51] Int. Cl.³ .............................................. H01G 1/01
[52] U.S. Cl. .................................... 361/273; 361/305
[58] Field of Search ................................. 361/273, 305

[56] References Cited

U.S. PATENT DOCUMENTS 2,934,687  4/1960  Maylandt ............................ 361/273
4,190,878  2/1980  Forster ............................ 361/273 X

FOREIGN PATENT DOCUMENTS 1087277  8/1960  Fed. Rep. of Germany ...... 361/305

*Primary Examiner*—Elliot A. Goldberg
*Attorney, Agent, or Firm*—Frishauf, Holtz, Goodman & Woodward

[57] ABSTRACT

To decrease the thickness of plastic foil capacitors using, for example, polycarbonate or polypropylene foils, and permit full utilization of the dielectric strength of the dielectric material without degradation of the electrode layer applied thereto, the electrode layer, typically of aluminum or zinc, has an additive of at least one of the metals Al, Ni, Mg, Ti, Hf, Be, Bi therein, present for example as an intermetallic compound, in a quantity of from 0.5 to 10%, preferably 2 to 5% (by weight). The electrode can be applied as a vapor-deposited coating, in which the additive is uniformly distributed. The previously observed decomposition of the electrode coating under applied voltages is thereby effectively prevented. Thus, the full dielectric strength of the dielectric material is utilized, resulting in a smaller and less expensive capacitor.

12 Claims, 1 Drawing Figure

SELF-HEALING THIN-LAYER ELECTRICAL CAPACITOR

The present invention relates to a self-healing capacitor, and particularly to a capacitor which is subjected to a-c operating potentials, useful, for example, in combination with fluorescent lamp circuits.

BACKGROUND AND PRIOR ART

Capacitors which are subjected to a-c, and particularly capacitors used with fluorescent lamps, frequently use a plastic as a dielectric on which a thin metallized layer is applied to form the electrode. The square or surface resistance of the electrode metallizing coating is approximately 3 ohms when the capacitor is first made. Already at intermediate electrical loading, that is, applying an electrical field across the capacitor, that is, across the dielectric, results in continued deterioration of the metallic coating. When a certain limiting field is reached, the deterioration, which increases with time, is in the form of circular degradation of the metallic layer so that, as the metallic layer degrades, the value of capacity of the capacitor decreases. A typical plastic dielectric is a foil of polypropylene. In such a foil, deterioration has been observed at a field strength of about 40 V/$\mu$m, at a frequency of 50 Hz.

Decrease in the capacity value can be avoided by increasing the thickness of the dielectric so that the field strength is reduced. The dielectric, however, can withstand a higher operating voltage from point of view of flash-over or burn-through. For example, fluorescent lamp capacitors using a metallized polypropylene foil or film as a dielectric, and designed for nominal voltages of between 220 to 250 V at 50 Hz, are made with a foil thickness of about 8 $\mu$m when using aluminum as a coating; a foil thickness of 6 $\mu$m, with a sufficiently thin aluminum coating and a square or surface resistance higher than 3.5 ohms, would be sufficient, however. The consequent field strength with a 6 $\mu$m foil would be excessive, however, since the aluminum coating or aluminum electrode surface area would degrade, particularly due to testing which requires 1.25 times the nominal working voltage, or more. The effect of this electrode coating degradation thus increases the cost of the resulting capacitor and also increases its volume more than necessary from a purely electrical insulation point of view.

It has previously been proposed to introduce a uniformly distributed additive of copper to the coating of aluminum in order to prevent degradation of the coating based on applied electrical field. Use of copper is not entirely satisfactory and the results achieved hardly warrant the additional complexity and expense.

THE INVENTION

It is an object to inhibit the deterioration of the electrode coating or layer so that the capacitor can be operated at voltages permissible by the insulating characteristic of the dielectric, and, particularly, to prevent degradation at increased average electrical field strength or, at least, to so decrease the degradation of the layer that, in practical applications, the capacity of the capacitor is not materially changed.

Briefly, the electrode coating layer which, preferably, is aluminum but may be of zinc or of another metal, contains a uniformly dispersed portion of at least one of the metals of the group Al, Ni, Mg, Ti, Hf, Be, Bi, in such quantity that the sum of the portion of the additive metals, by weight, is between about 0.5% to 10%, preferably 2% to 5%.

It has been found that metals or combination of metals other than copper can be used with equal and in many instances better results to prevent degradation of the electrode layer when added to the electrode layer coating. Thus, the degradation of the electrode layer would occur only at field strengths which are substantially in excess of those which can be tolerated by metal layers customarily used, typically pure aluminum.

The capacitors which are so constructed can be made as single-layer capacitors with metallized polypropylene or polycarbonate foils or films and provide capacitors in which the thickness of the foils or films up to 6 $\mu$m can tolerate a-c nominal voltages to 300 V; thicknesses of up to 8 $\mu$m voltages of between 400 to 500 V a-c, and thicknesses with about 9 $\mu$m, or higher, can tolerate voltages of over 500 V a-c. The voltages are applied at nominal power frequencies, that is, 50 to 60 Hz.

The capacitor is self-healing, and the previously observed degradation of the electrode coating or layer, depending on field strength, is effectively inhibited. The capacitor can be made in accordance with well known processes and without any changes in the manufacturing processes. A typical manufacturing process is vapor deposition; the additive or a suitable combination of additive materials can merely be added to the vapor deposition vaporization apparatus. The average proportion of the added metal, or the sum of the metals being added if a combination of metals is selected, is preferably between 2 and 5% if the base metal for the electrode coating is aluminum. This range is not critical and can extend from between 0.5 to 10% (by weight). Lower proportion of additives, which may occur for example by contamination of the electrode metal, practically have no influence on the stability of the electrode layer; if the quantity of additives exceeds about 10%, no improvement could be noticed with respect to resistance to degradation of the electrode layer. Since the additives decrease the conductivity of the electrode layer, the range of additives should be kept within that which provides the desired effect without materially decreasing the conductivity, that is, effectively below 10% (by weight) and preferably not more than about 5%.

It has been found particularly desirable to use the further metals in the form of intermetallic compounds together with the electrode coating metal. The average coating with an aluminum layer, preferably, is at least about 6 $\mu$g/cm$^2$. If the electrode, however, is a Zn layer, a suitable average surface coating is at least 8 $\mu$g/cm$^2$. Preferably, the coating is made by vapor deposition, since layers of desired type and high uniformity can be made inexpensively. The self-healing characteristics of the electrical capacitor are particularly good if the electrode layer has a corresponding low average coating thickness.

The coating layer is of particular advantage when the base coating is aluminum; other base coatings can be used, however, such as zinc, zinc-cadmium, or zinc-magnesium layers, to which further metals of the group Al, Ni, Mg, Ti, Hf, Be, Bi are added, singly or in combination.

EXAMPLE

A polypropylene tape or ribbon of 6 $\mu$m thickness has applied thereto by thermal vacuum deposition an aluminum layer with a square resistance of from 5 to 7 ohms, the additive metal is at least 0.02% and not more than about 10% for the single element overall at least 0.5% and at the most about 10%, if sufficiently good conductivity of the layer is desired while simultaneously effectively preventing degradation of the electrode layer. It has been found that as the layer decreases in thickness, the effect of the additive also decreases. For practical applications, therefore, an average aluminum layer thickness of about 6 $\mu g/cm^2$ is recommended as the lowest limit. The additives, singly or in combination, which are added to aluminum layers have—as known—the common characteristic that the atomic radii differ by at least 1% from that of aluminum. The atomic radii can be determined in accordance with known principles of physical chemistry—see, for example, D'Ans-Lax, "Handbook for Chemists and Physicists", vol. 1, 3rd Ed., Publ. by Springer, 1967. The combinations of additives and the selection possible, singly or in combination, has the substantial advantage that the technology of application of the layer is not changed from that without the additives. Selection of various additional additives is possible so that there is less dependence on availability on any one of the materials in the open market, so that price variations affecting any one of the materials which may have been used are of less concern. This is particularly important if a combination of various additives is considered, since the materials referred to have other commercial uses and are thus available, for example as additives used in the welding field.

The coating layers can be made by any well known chemical or physical metallizing process, provided that the coating has a sufficiently homogeneous distribution of the base electrode material and of the additives in the base electrode material, while excluding undesirable contaminants. For example, it may be desirable to provide for vapor deposition from a single alloy material or, alternatively, to vapor-deposit two output materials which, if necessary, can be vaporized in separate containers. If the vaporization rates of the various components of a multiple-component layer differ—with similar vaporization conditions—then it may be necessary to use alloyed materials as the base or starting materials or separate controls must be provided for vaporization of the material from separate supply containers or troughs.

The coating permits higher nominal field strengths in capacitors and thus permits reduction of the size and of the price of capacitors with respect to any particular nominal voltage. No additional costs are incurred during the manufacture by vapor deposition, so that both manufacturing technological advantages as well as economic advantages are thereby obtained. It is not necessary to use intermediate layers or multiple-layer systems, as has previously been proposed. Combination of aluminum with a zinc coating has the advantage that the higher conductivity of the aluminum can be utilized and, additionally, that the aluminum will provide an aluminum oxide skin so that the overall thickness of the electrode coating can be reduced.

The electrode coating causes complete burn-out in the region of possible flash-overs or arc-through of the capacitor caused, for example, by high voltage peaks which may arise in operation. Thus, arc-over or flash-over within the capacitor through the dielectric does not interfere with the operation of the capacitor as such. Higher test voltages can be used without danger of poor flash-over points within the capacitor so that it is possible to operate with shorter test periods while increasing the test voltage. Since the electrode coating layer can be thinner, the vapor deposition time is reduced, which has the advantage that the support foil, that is, the dielectric, is less thermally stressed.

The electrode coatings or layers can be used in impregnated and in non-impregnated capacitors to good advantage. Degradation of the electrode coating layer has been observed also in impregnated capacitors from a predetermined upper average field strength. For example, capacitors with dual metallized field-free paper tapes or webs, and polycarbonate foils as the dielectric, may have a coating degradation of a pure aluminum electrode layer at an average field strength of about 80 V/$\mu$m; such degradation was already observed at that voltage, at power frequency (50 Hz). Capacitors with a mixed dielectric of 8 $\mu$m metallized paper tape and 6 $\mu$m polypropylene foil with a square resistance of the aluminum layer of about 15 ohms have a noticeable layer degradation at a voltage of 475 V (at 50 Hz).

The self-healing capacity of the capacitor is increased as the material in the electrode layer or coating is decreased, since the energy which is released by the arc occurring upon flash-over or arc-through is decreased. The electrode coating can be decreased substantially when using the mixed coating layer with the additives as described. In a pure aluminum layer, a portion of the aluminum is not contributing to the conduction, since the aluminum will be present in the form of oxide or hydroxide.

Drawing, illustrating an example, wherein the single FIGURE is a highly schematic cross-sectional view through a portion of the capacitor dielectric with the layer applied thereto.

The capacitor has a dielectric 1, for example a polypropylene or polycarbonate foil of about 6 $\mu$m thickness, on which an electrode layer 2 of aluminum or zinc is applied with a coverage of at least about 6 or 8 $\mu g/cm^2$, respectively, to which one or more of the metals of Ni, Mg, Ti, Hf, Be, Bi is added; if the basis of the layer 2 is zinc, then aluminum may also be used in addition to the foregoing named metals.

Various changes and modifications may be made within the scope of the inventive concept.

I claim:

1. Self-healing capacitor, particularly for a-c use, comprising
    a dielectric film or foil and an aluminum electrode coating on said dielectric, and an opposed electrode,
    wherein, in accordance with the invention,
    to prevent field-dependent degradation of the electrode coating, the aluminum electrode coating contains a uniformly distributed additive metal in a quantity of from 0.5 to 10% by weight of at least one of the metals selected from the group consisting of Ni, Mg, Ti, Hf, and Be.

2. Capacitor according to claim 1 wherein said additive metals are primarily present in the form of an intermetallic compound with the aluminum and wherein the aluminum electrode coating layer is in a thickness of about at least 6 $\mu g/cm^2$.

3. Capacitor according to claim 1 or 2 wherein said additive metal is present in an amount between 2 and 5%.

4. Capacitor according to claim 3 wherein said additive metal is magnesium.

5. Capacitor according to claim 1 or 2 wherein said additive metal is magnesium.

6. Capacitor according to claim 1 or 2 wherein the film or foil comprises at least one selected from the group consisting of polypropylene and polycarbonate;

and has, for nominal a-c operating voltages, at power frequencies, thicknesses as given below:

up to 320 V, thickness to 6 μm,
400 to 500 V, thickness 8 μm,
voltages over 500 V to 600 V, thickness to 9 μm.

7. Capacitor according to claim 4 wherein the film or foil comprises at least one selected from the group consisting of polypropylene and polycarbonate;

and has, for nominal a-c operating voltages, at power frequencies, thicknesses as given below:

up to 320 V, thickness to 6 μm,
400 to 500 V, thickness 8 μm,
voltages over 500 V to 600 V, thickness to 9 μm.

8. Capacitor according to claim 5 wherein the film or foil comprises at least one selected from the group consisting of polypropylene and polycarbonate;

and has, for nominal a-c operating voltages, at power frequencies, thicknesses as given below:

up to 320 V, thickness to 6 μm,
400 to 500 V, thickness 8 μm,
voltages over 500 V to 600 V, thickness to 9 μm.

9. Self-healing capacitor, particularly for a-c use, comprising a dielectric film or foil and a zinc electrode coating on said dielectric, and an opposed electrode, wherein, in accordance with the invention, to prevent field-dependent degradation of the electrode coating, the zinc electrode coating contains a uniformly distributed additive metal in a quantity of from 0.5 to 10% by weight of at least one of the metals of the group consisting of Al, Ni, Mg, Ti, Hf, and Be, and wherein said additive metal is primarily present in the form of an intermetallic compound with the zinc electrode layer.

10. Capacitor according to claim 9 wherein said zinc electrode coating layer is in an amount about at least 8 μm/cm$^2$, and wherein said additive metal is in an amount of between 2 and 5%.

11. Capacitor according to claim 9 or 10 wherein the film or foil comprises at least one selected from the group consisting of polypropylene and polycarbonate;

and has, for nominal a-c operating voltages, at power frequencies, thicknesses as given below:

up to 320 V, thickness to 6 μm,
400 to 500 V, thickness 8 μm,
voltages over 500 V to 600 V, thickness to 9 μm.

12. Capacitor according to claim 10 wherein said additive is magnesium and is present in an amount between about 2 and 5%.

* * * * *